US012749122B2

(12) United States Patent
Davis

(10) Patent No.: US 12,749,122 B2
(45) Date of Patent: Sep. 29, 2026

(54) SYSTEM AND METHOD FOR USING AI/ML TO CATEGORIZE FINANCIAL TRANSACTION DATA FOR HOT STORAGE, COLD STORAGE, OR DELETION BASED ON DATA SIGNIFICANCE

(71) Applicant: Alexander Davis, Oxnard, CA (US)

(72) Inventor: Alexander Davis, Oxnard, CA (US)

( * ) Notice: Subject to any disclaimer, the term of this patent is extended or adjusted under 35 U.S.C. 154(b) by 24 days.

(21) Appl. No.: 18/935,614

(22) Filed: Nov. 3, 2024

(65) Prior Publication Data

US 2026/0127672 A1 May 7, 2026

(51) Int. Cl.

*G06Q 40/06* (2012.01)
*G06N 3/04* (2023.01)
*G06Q 20/38* (2012.01)

(52) U.S. Cl.

CPC ............... *G06Q 40/06* (2013.01); *G06N 3/04* (2013.01); *G06Q 20/389* (2013.01)

(58) Field of Classification Search

USPC ............................................................ 705/36
See application file for complete search history.

(56) References Cited

U.S. PATENT DOCUMENTS 8,447,666 B1 * 5/2013 Keld .................... G06Q 20/227 705/16
8,924,393 B1 * 12/2014 Channakeshava ..... G06Q 40/12 707/738

(Continued)

FOREIGN PATENT DOCUMENTS

CN 112150285 A * 12/2020 ....... G06F 18/23213
CN 118229414 A * 6/2024 ............. G06Q 40/04

(Continued)

OTHER PUBLICATIONS

Title: Spiking Neural Networks for Inference and Learning: A Memristor-based Design Perspective Authors: M. E. Fouda et al. Date: Oct. 9, 2019 Source: Cornell University (Year: 2019).*

(Continued)

*Primary Examiner* — Bennett M Sigmond
*Assistant Examiner* — Yongsik Park
(74) *Attorney, Agent, or Firm* — Sam Pierce

(57) ABSTRACT

The present invention relates to a system and method for the automated categorization, management, and storage of financial transaction data using artificial intelligence (AI) and machine learning (ML) algorithms. The system processes large volumes of financial data, such as tax records, transaction histories, and receipts, by assigning a significance score to each data item based on its relevance, legal obligations, and usage frequency. Data is categorized into hot storage for critical, frequently accessed data, cold storage for infrequently accessed but legally significant data, or flagged for deletion when deemed redundant or obsolete. The system includes a user interface allowing customization of significance thresholds and storage preferences, ensuring compliance with retention policies and auditing standards. By automating the categorization process, the invention optimizes storage resources, reduces costs, enhances data accessibility, and provides robust security measures, including encryption. This invention continuously improves through user feedback and retraining of the AI/ML models.

9 Claims, 1 Drawing Sheet

(56) References Cited

U.S. PATENT DOCUMENTS

| | | | | |
|---|---|---|---|---|
| 9,542,710 | B1 * | 1/2017 | Izrailevsky | G06Q 40/12 |
| 10,096,071 | B1 * | 10/2018 | Krakowiecki | G06Q 40/12 |
| 10,204,161 | B1 * | 2/2019 | Krakowiecki | G06F 16/9535 |
| 10,825,104 | B1 * | 11/2020 | Shanmugam | G06Q 30/04 |
| 11,615,493 | B2 * | 3/2023 | Mulligan | G06Q 50/18<br>705/4 |
| 12,333,567 | B2 * | 6/2025 | Jayaraman | G06Q 30/0255 |
| 2018/0018734 | A1 * | 1/2018 | Ho | G06Q 40/06 |

FOREIGN PATENT DOCUMENTS

| | | | | | |
|---|---|---|---|---|---|
| CN | 118862129 | B | * | 1/2025 | G06F 18/20 |
| EP | 1821250 | A1 | * | 8/2007 | G06Q 40/03 |
| KR | 20220095067 | A | * | 7/2022 | G06Q 30/0241 |

OTHER PUBLICATIONS

Title: Applying Data Protection and Confidentiality in a Hybrid Cloud Environment Authors: Bill White et al. Date: Feb. 23, 2024 Source: IBM Redbook (Year: 2024).*

* cited by examiner

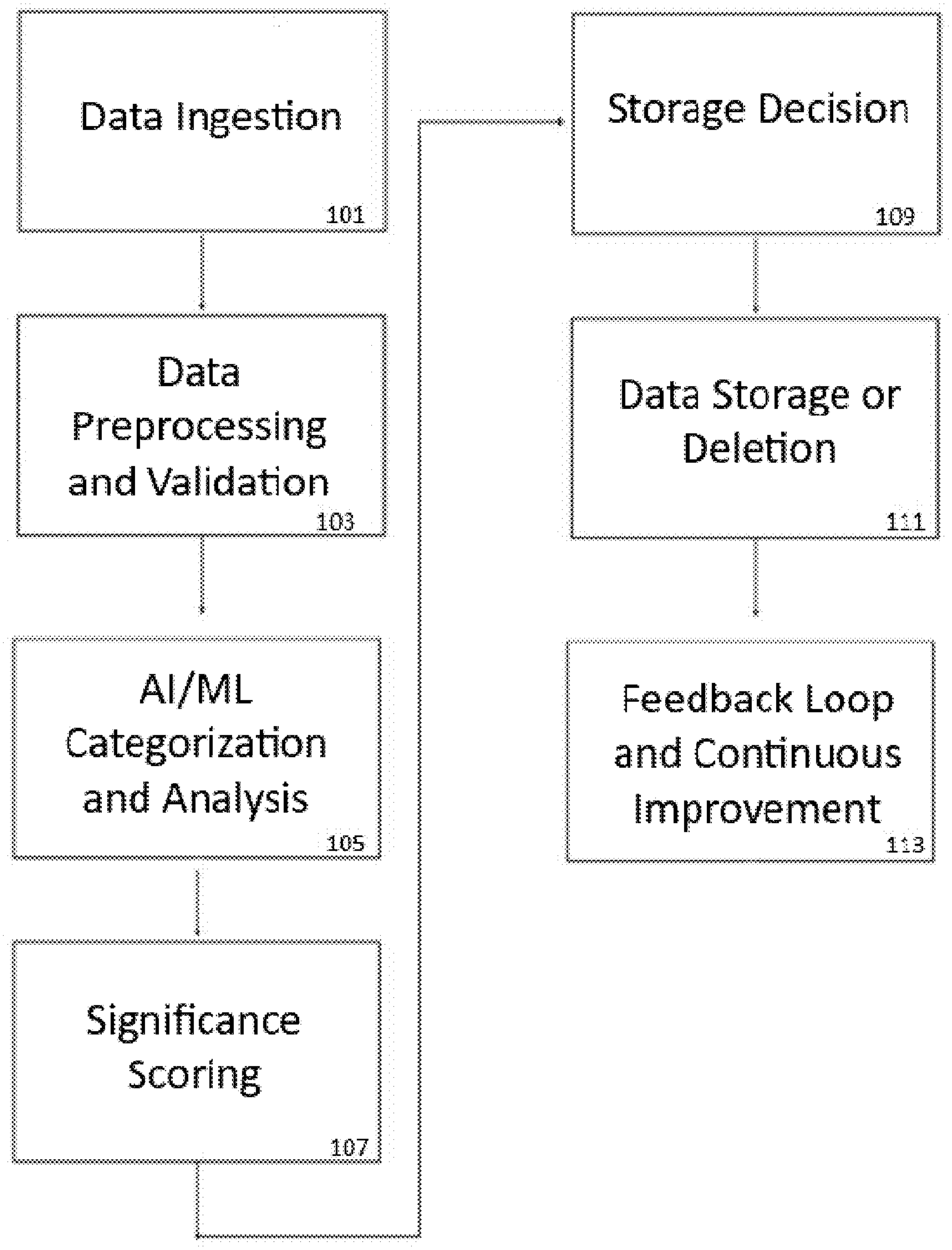
Data Ingestion
101
Data Preprocessing and Validation
103
AI/ML Categorization and Analysis
105
Significance Scoring
107
Storage Decision
109
Data Storage or Deletion
111
Feedback Loop and Continuous Improvement
113

SYSTEM AND METHOD FOR USING AI/ML TO CATEGORIZE FINANCIAL TRANSACTION DATA FOR HOT STORAGE, COLD STORAGE, OR DELETION BASED ON DATA SIGNIFICANCE

BACKGROUND OF THE INVENTION

Field of Invention

This invention relates to the field of data management and storage, specifically to the automated classification, categorization, and handling of large volumes of financial transaction data using artificial intelligence (AI) and machine learning (ML). It focuses on the efficient allocation of such data into appropriate storage systems, such as hot storage for frequently accessed information, cold storage for rarely accessed but still significant data, and deletion for unnecessary or redundant records. This system and method are particularly applicable in industries handling large volumes of sensitive financial information, such as accounting, banking, auditing, and tax management.

BRIEF SUMMARY OF THE INVENTION

The present invention provides a system and method that leverages artificial intelligence (AI) and machine learning (ML) for the automated classification and storage of large volumes of data, particularly financial transaction data. The system analyzes the data and categorizes it based on its significance and usage frequency, with the capability to allocate the data into appropriate storage tiers. "Hot storage" is used for frequently accessed or critical data, "cold storage" for data that is rarely needed but still significant for record-keeping, and non-essential data is flagged for deletion to optimize storage resources. This invention enhances data management efficiency, minimizes costs, and improves accessibility for professionals in fields such as finance, accounting, tax management, and auditing.

BRIEF DESCRIPTION OF THE FIGURES

FIG. 1: step by step of the invention's process.

DETAILED DESCRIPTION

The detailed description of this invention outlines the technical framework and operational process for an AI/ML-driven system that categorizes and manages data based on its significance, relevance, and future utility, with a specific emphasis on financial transaction data such as tax records.

System Architecture

The system architecture is comprised of multiple integrated components designed to analyze, categorize, and store data. It includes:

Data Ingestion Module: This module handles the intake of raw financial data, such as tax records, transaction histories, invoices, and receipts. Data can be imported from various sources, including manual input, financial software, and banking APIs. The system employs a robust input validation and normalization process, ensuring consistency in data formats before further processing.

AI/ML Categorization Engine: The core of the system, this engine is powered by machine learning algorithms trained to classify data based on predetermined categories of significance. The engine utilizes natural language processing (NLP) and pattern recognition to identify key attributes in financial data, such as transaction amounts, types of transactions (income, expense, capital gain), tax codes, and audit significance.

Training Model: The machine learning models are continuously trained using historical financial data and patterns. The model improves its accuracy over time by learning from new datasets and user feedback. The training includes supervised learning models that classify data based on specific characteristics, with periodic updates and retraining.

Significance Scoring: The categorization engine assigns a significance score to each data item. The significance score is based on parameters such as transaction size, legal obligations, tax relevance, and audit risk. For example, transactions that impact tax filings or large transactions with potential audit risks will receive a higher significance score.

Storage Decision Module: Based on the significance score, the system determines the appropriate storage solution for each data item. The categorization engine passes the data to the storage decision module, which is responsible for managing the following storage options:

Hot Storage: Critical data that is frequently accessed or required for immediate processing is stored in hot storage. This type of storage is optimized for speed and availability, using high-performance infrastructure. Examples of data stored here include ongoing tax records, recurring transactions, and flagged transactions with audit risks.

Cold Storage: Data that is infrequently accessed but still necessary for legal or historical purposes is stored in cold storage. This storage type is more cost-effective and slower in access speed but ideal for archival purposes. Data stored in cold storage includes historical tax records, infrequently used transaction records, or data needed for long-term audits.

Deletion Module: Data that is deemed insignificant or obsolete is flagged for deletion. The system identifies redundant, outdated, or unnecessary data that no longer holds relevance for legal, tax, or business purposes, reducing storage costs and improving overall system efficiency.

User Interface & Customization: Users interact with the system through a user-friendly interface that allows for customization of storage preferences. For example, tax professionals can specify which tax codes or types of transactions are automatically routed to hot storage or flagged for audit. Users can also adjust significance thresholds, providing them with greater control over the data management process.

Automated Backup and Compliance Checks: To ensure data integrity and regulatory compliance, the system includes automated backup features and compliance checks. Financial institutions and businesses must retain records for specific periods to comply with tax regulations. The system monitors data retention policies and automatically migrates data to appropriate storage tiers as necessary to maintain compliance with retention laws and auditing standards.

Data Security and Encryption: Given the sensitive nature of financial data, the system employs encryption at both rest and transit levels. Advanced security protocols protect the data from unauthorized access, ensuring that the integrity and confidentiality of sensitive information such as tax filings and financial records are maintained.

Feedback Loop for Continuous Improvement: Users are encouraged to provide feedback on data categorization accuracy. This feedback loop is incorporated into the machine learning model to refine data classification, enhance prediction accuracy, and improve the system's overall effectiveness in handling new and unique data sets.

Advantages Over Existing Systems

The invention offers several key advantages over traditional data management systems:

Automated Classification: Unlike manual data entry and classification systems, the AI/ML-driven categorization engine automates the process of sorting and storing data, saving significant time for tax professionals and financial managers.

Optimized Storage: By classifying data based on its significance and usage frequency, the system optimizes storage solutions, reducing the cost of storing low-priority data while ensuring critical data is readily accessible. This hierarchical approach to data storage is more efficient than blanket storage methods.

Deletion of Redundant Data: The automated deletion of irrelevant or obsolete data reduces the burden on storage infrastructure, while also mitigating risks associated with holding unnecessary financial data, such as accidental breaches or audit complications.

Real-Time and Historical Insights: Users can access real-time insights on current financial data, as well as historical records that have been stored in cold storage. This makes the system a valuable tool for audit preparation, tax filings, and financial forecasting.

Scalability: The architecture is designed to handle large datasets, making it suitable for businesses and institutions of all sizes. Whether it's a small business managing daily transactions or a financial institution processing millions of tax records, the system scales accordingly.

Potential Future Applications

While this invention is currently focused on financial data, the underlying AI/ML categorization system can be adapted to other industries. Potential future applications include:

Legal Document Management: The system could be adapted to classify and store legal documents based on their significance for ongoing cases or regulatory compliance.

Healthcare Data Storage: Hospitals and clinics could use the system to store medical records, ensuring that critical patient data is accessible while less relevant information is archived.

Scientific Research Data: Research institutions could utilize the system for the classification and storage of experimental data, with priority given to high-impact findings and archiving older or less critical data sets.

This invention revolutionizes how large volumes of financial and other transactional data are managed, ensuring that businesses operate more efficiently while minimizing risks associated with data storage and compliance.

To proceed with coding the app for your patent FIN001 (the AI/ML-based data categorization system for financial transaction data), I will create a basic framework for you, providing an outline and some Python code for the core functionality.

Code Outline for AI/ML Data Categorization System

1. Import Libraries:

For this project, you'll need libraries for data handling, machine learning, and storage management.

```
import pandas as pd
import numpy as np
from sklearn.model_selection import train_test_split
from sklearn.ensemble import RandomForestClassifier
from sklearn.preprocessing import LabelEncoder
import os
import shutil
```

2. Data Ingestion and Preprocessing:

The first step is to load financial data, preprocess it, and assign labels (hot storage, cold storage, or delete).

```
def load_data(file_path):
    # Load transaction data from a CSV or database
    data = pd.read_csv(file_path)
    return data
def preprocess_data(data):
    # Example of preprocessing: remove duplicates, handle NaN values,
and encode categorical data
    data = data.drop_duplicates( )
    data = data.fillna(method='ffill')
    # Assume 'Category' and 'Amount' are columns in the dataset
    le = LabelEncoder( )
    data['Category'] = le.fit_transform(data['Category'])
    return data
```

3. Feature Engineering:

Generate the features that will help the machine learning model to predict whether data goes to hot storage, cold storage, or deletion.

```
def feature_engineering(data):
    # Create any new features needed based on financial transactions
    data['Significance'] = data['Amount'] * data['Category'] # Just an
example of feature
    return data
```

4. Model Training:

A simple classifier like a Random Forest can be used to categorize data based on significance. For example, high-value financial transactions can be stored in hot storage, less significant transactions in cold storage, and insignificant transactions can be deleted.

```
def train_model(data):
    X = data[['Category', 'Amount', 'Significance']] # Features
    y = data['Storage_Label'] # Labels ('Hot', 'Cold', 'Delete')
    X_train, X_test, y_train, y_test = train_test_split(X, y, test_size=0.2)
    # Train a Random Forest Classifier
    clf = RandomForestClassifier(n_estimators=100)
    clf.fit(X_train, y_train)
    # Return trained model
    return clf
```

5. Prediction and Categorization:

Once the model is trained, use it to predict which storage type should be assigned to incoming data.

```
def predict_storage(model, data):
    predictions = model.predict(data[['Category', 'Amount', 'Significance']])
    return predictions
```

6. Storing Data in Hot/Cold Storage or Deletion:

Using the predictions, sort the data and store it accordingly. You can utilize different storage paths for this purpose.

```
def store_data(data, predictions):
    for i in range(len(predictions)):
        if predictions[i] == 'Hot':
            # Save the file in hot storage directory
            shutil.move(data['file_path'][i], 'hot_storage/')
        elif predictions[i] == 'Cold':
            # Save the file in cold storage directory
            shutil.move(data['file_path'][i], 'cold_storage/')
        else:
            # Delete the file
            os.remove(data['file_path'][i])
```

7. Complete Pipeline:

You can integrate all of the above steps into one cohesive pipeline.

```
def main( ):
    # Load and preprocess data
    data = load_data('transactions.csv')
    data = preprocess_data(data)
    # Feature engineering
    data = feature_engineering(data)
    # Train the model
    model = train_model(data)
    # Predict and store
    predictions = predict_storage(model, data)
    store_data(data, predictions)
if __name__ == "__main__":
    main( )
```

DETAILED DESCRIPTION OF FIGURES

FIG. 1.101 Data Ingestion: The system receives financial transaction data from multiple sources, including manual input, financial software, and banking APIs. The data is uploaded to the system for further analysis.

FIG. 1.103 Data Preprocessing and Validation: The raw data is cleaned and standardized. This involves removing duplicates, filling in missing values, and converting all data into a consistent format to ensure accurate processing. The system checks for errors and validates the data structure before passing it to the categorization engine.

FIG. 1.105 AI/ML Categorization and Analysis: The machine learning categorization engine processes the data using pre-trained models. It comprises an application-specific integrated circuit (ASIC) for an artificial neural network connected to the computer memory device, the ASIC comprising: a plurality of neurons organized in an array, wherein each neuron comprises a register, a processing element and at least one input, and a plurality of synaptic circuits, each synaptic circuit including a memory for storing a synaptic weight, wherein each neuron is connected to at least one other neuron via one of the plurality of synaptic circuits. It analyzes transaction attributes like amounts, transaction types, and tax codes, and applies natural language processing (NLP) to extract key information. The data is then classified into categories based on its attributes and significance.

FIG. 1.107 Significance Scoring: The system assigns a significance score to each data entry based on pre-determined criteria such as transaction amount, legal obligations, and audit risk. High-value transactions or those with audit implications receive higher significance scores.

FIG. 1.109 Storage Decision: Based on the significance score, the system determines whether the data should be stored in hot storage (for frequently accessed, high-importance data), cold storage (for rarely accessed but important data), or flagged for deletion (if deemed insignificant or redundant).

FIG. 1.111 Data Storage or Deletion: The categorized data is either moved to hot storage, cold storage, or permanently deleted. Hot storage uses fast, high-performance infrastructure for immediate access, cold storage provides long-term archival solutions, and deletion frees up resources by removing obsolete data.

FIG. 1.113 Feedback Loop and Continuous Improvement: User feedback on the system's categorization accuracy is collected and fed into the machine learning models. This retrains and updates the system to improve its ability to accurately categorize and score new data in the future, ensuring continuous enhancement of the system's performance.

What is claimed is:

1. A system for categorizing financial transaction data for storage, comprising:

a. A computer memory device storing financial transaction data from a plurality of sources, comprising one or more keyboard input/output devices and one or more banking Application Programming Interfaces (APIs) and import libraries for data handling machine learning, and storage management;

b. Wherein the system is configured to generate a plurality of features each comprising results of operations on multiple columns in the dataset and to preprocess the transaction data to remove duplicates, handle Not a Number (NaN) values, and encode categorical data;

c. An Artificial Intelligence/Machine Learning (AI/ML) categorization engine comprising an application-specific integrated circuit (ASIC) for an artificial neural network connected to the computer memory device, the ASIC comprising: a plurality of neurons organized in an array, wherein each neuron comprises a register, a processing element and at least one input, and a plurality of synaptic circuits, each synaptic circuit including a memory for storing a synaptic weight, wherein each neuron is connected to at least one other neuron via one of the plurality of synaptic circuits configured, configured to analyze said financial transaction data using machine learning algorithms trained on historical datasets, wherein the AI/ML categorization engine identifies transaction attributes, assigns significance scores, and classifies said data into categories, wherein the AI/ML categorization engine is pretrained to predict whether data goes to hot storage, cold storage, or deletion;

d. wherein the system is operatively coupled to the AI/ML categorization engine, and configured to use Random Forest to assign significance scores to said financial transaction data based on pre-defined parameters including, but not limited to, transaction amounts, transaction types, legal obligations, tax relevance, and audit risk;

e. wherein the system is configured to allocate said financial transaction data into one of the following storage tiers based on said significance score:

i. Hot storage for financial transaction data classified as high-priority, frequently accessed, or subject to immediate regulatory or audit requirements;

ii. Cold storage for financial transaction data classified as low-priority, infrequently accessed, or retained for legal or historical record-keeping purposes;

iii. Deletion for financial transaction data classified as redundant, obsolete, or insignificant for legal, financial, or business purposes;

f. Wherein the system is configured to save the file in a directory corresponding to the allocated storage tier or to delete the file:

g. A user interface configured to allow users to modify storage preferences, significance thresholds, and categorization parameters;

h. wherein the system is configured to ensure said system adheres to regulatory retention policies and auditing standards applicable to financial data and wherein the system employs encryption at both rest and transit levels.

2. The system of claim 1, wherein the AI/ML categorization engine utilizes natural language processing (NLP) to identify keywords, patterns, and attributes within said financial transaction data.

3. The system of claim 1, further comprising a training model configured to update said AI/ML categorization engine based on user feedback, thereby improving the accuracy and relevance of future data categorization.

4. The system of claim 1, wherein the system is further configured to normalize and validate said financial transaction data prior to categorization, ensuring consistency in data format across various input sources.

5. A method for categorizing and storing financial transaction data, comprising the steps of:

a. Receiving financial transaction data through a data ingestion module from a plurality of sources, including manual input, financial software, and banking APIs;

b. generate a plurality of features comprising:

c. Analyzing said financial transaction data through an AI/ML categorization engine, wherein said AI/ML categorization engine is trained to identify transaction attributes and assign significance scores based on parameters such as transaction amount, transaction type, tax relevance, and audit risk using a Random Forest, wherein the AI/ML categorization engine is pretrained to predict whether data goes to hot storage, cold storage, or deletion;

d. Assigning a significance score to each transaction record within said financial transaction data;

e. Allocating said financial transaction data into one of the following storage tiers based on said significance score:

i. Hot storage for high-priority, frequently accessed, or critical data;

ii. Cold storage for low-priority, infrequently accessed, or archival data;

iii. Deletion for redundant, obsolete, or insignificant data;

f. save the file in a directory corresponding to the allocated storage tier or to delete the file;

f. Allowing user customization of significance thresholds and storage preferences via a user interface;

g. Performing automated compliance checks to ensure the retention of financial transaction data adheres to applicable legal and regulatory standards; and g. employing encryption at both rest and transit levels.

6. The method of claim 5, further comprising the step of encrypting said financial transaction data both at rest and in transit to ensure data security.

7. The method of claim 5, wherein the significance score is continuously updated based on new transaction data and evolving legal or audit requirements.

8. The method of claim 5, wherein redundant or obsolete financial transaction data is automatically flagged for deletion, thereby optimizing storage resources.

9. The method of claim 5, further comprising the step of receiving user feedback on data categorization accuracy, wherein said user feedback is incorporated into retraining the AI/ML categorization engine.

* * * * *